United States Patent [19]

Franzini et al.

[11] Patent Number: 5,310,518
[45] Date of Patent: May 10, 1994

[54] METHOD AND DEVICE FOR MANUFACTURING CURING BLADDERS

[75] Inventors: Marco Franzini, DiLatina; Fabrizio Giovannucci, Rome; Attilio Pomenti, Rome; Gordon M. Tomlinson, Rome, all of Italy

[73] Assignee: Bridgestone/Firestone, Inc., Akron, Ohio

[21] Appl. No.: 774,759

[22] Filed: Oct. 9, 1991

[30] Foreign Application Priority Data

Nov. 9, 1990 [IT] Italy .................. 67878-A/90

[51] Int. Cl.⁵ ............................. B29C 45/00
[52] U.S. Cl. .................. 264/326; 264/328.3; 264/328.5; 425/49
[58] Field of Search ............ 425/37, 47, 49, 408, 425/551, 251, 578–585, 556, DIG. 228; 264/326, 328.3, 328.4, 328.5

[56] References Cited

U.S. PATENT DOCUMENTS

| 1,343,460 | 6/1920 | Macbeth | 264/335 |
| 2,724,425 | 11/1955 | Östling | 264/328.3 |
| 3,145,423 | 8/1964 | Horvereid | 264/328.3 |
| 3,459,849 | 8/1969 | DeRonde | 264/328.3 |
| 3,813,197 | 5/1974 | Ray et al. | 425/111 |
| 3,892,512 | 7/1975 | Diehl | 425/251 |
| 3,989,793 | 11/1976 | Hertel et al. | 264/328.4 |
| 4,531,902 | 7/1985 | Stuhldreher et al. | 425/408 |
| 4,954,074 | 9/1990 | Cohen | 425/556 |
| 4,957,676 | 9/1990 | Greenwood | 264/335 |

FOREIGN PATENT DOCUMENTS

| 1159675 | 7/1969 | United Kingdom . |
| 1234832 | 6/1971 | United Kingdom . |
| 2118492 | 11/1983 | United Kingdom | 264/328.3 |

OTHER PUBLICATIONS

Patent Abstracts of Japan vol. 12, No. 376 (M-750) (3223) Oct. 7, 1988.
Patent Abstracts of Japan vol. 12, No. 142 (M-692) (2989) Apr. 30, 1988.
Patent Abstracts of Japan vol. 8, No. 244 (M-337) (1681) Nov. 9, 1984.

*Primary Examiner*—Tim Heitbrink
*Attorney, Agent, or Firm*—D. A. Thomas

[57] ABSTRACT

A method and device for manufacturing curing bladders (2), whereby a curing mold (3) defines, via a first (4) and second (5) half mold and an inner core (6), an inner molding chamber (7) and an outer injection chamber (34) communicating with the inner chamber (7) and consisting of a variable-volume chamber of an injection cylinder (59); the outer chamber (34) being fed with a mass (35) of heated uncured rubber which is injected into the inner chamber (7) with the mold (3) closed and, when cured, is extracted from the mold (3) by opening the inner chamber (7) and extracting the inner core (6).

9 Claims, 4 Drawing Sheets

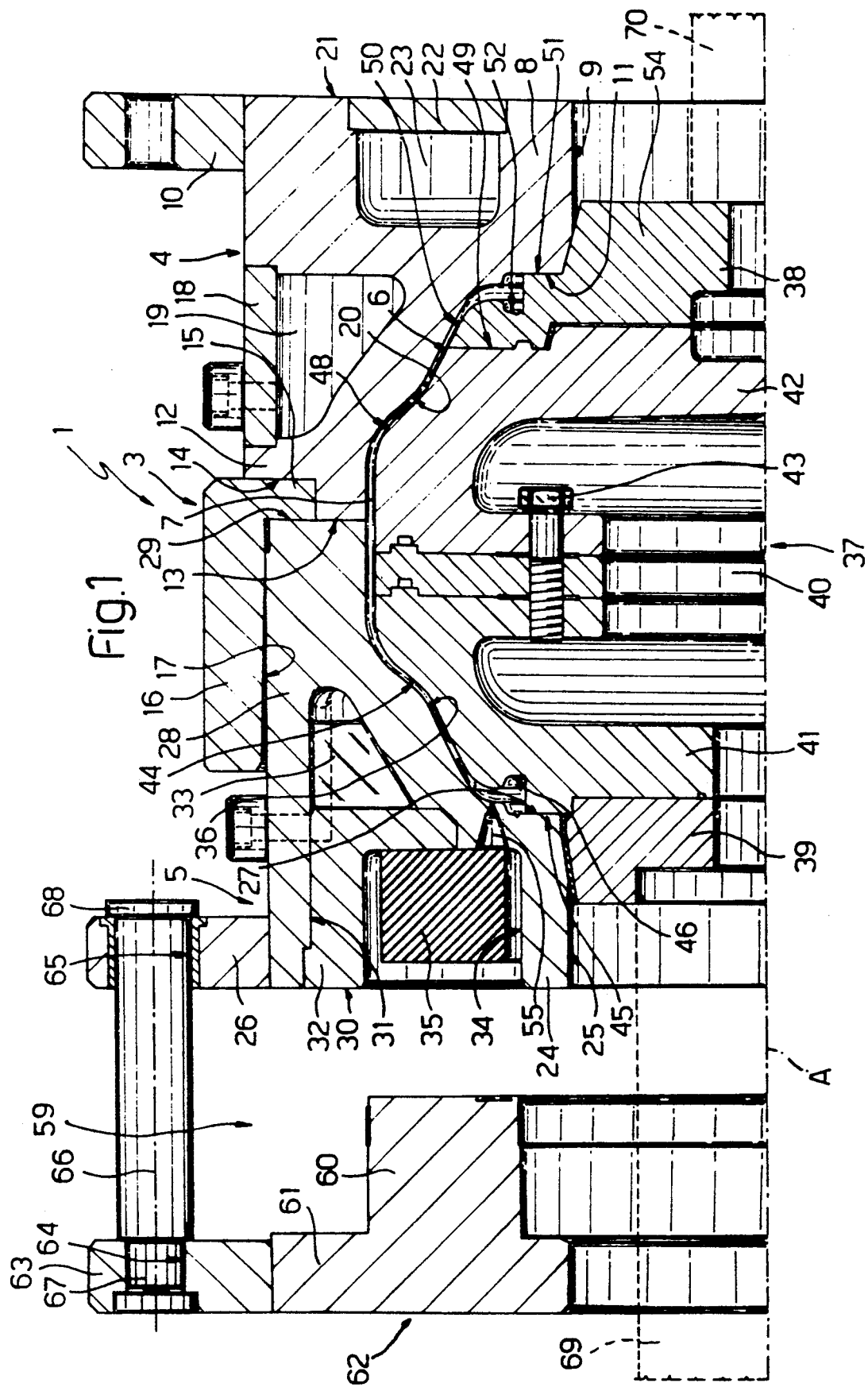

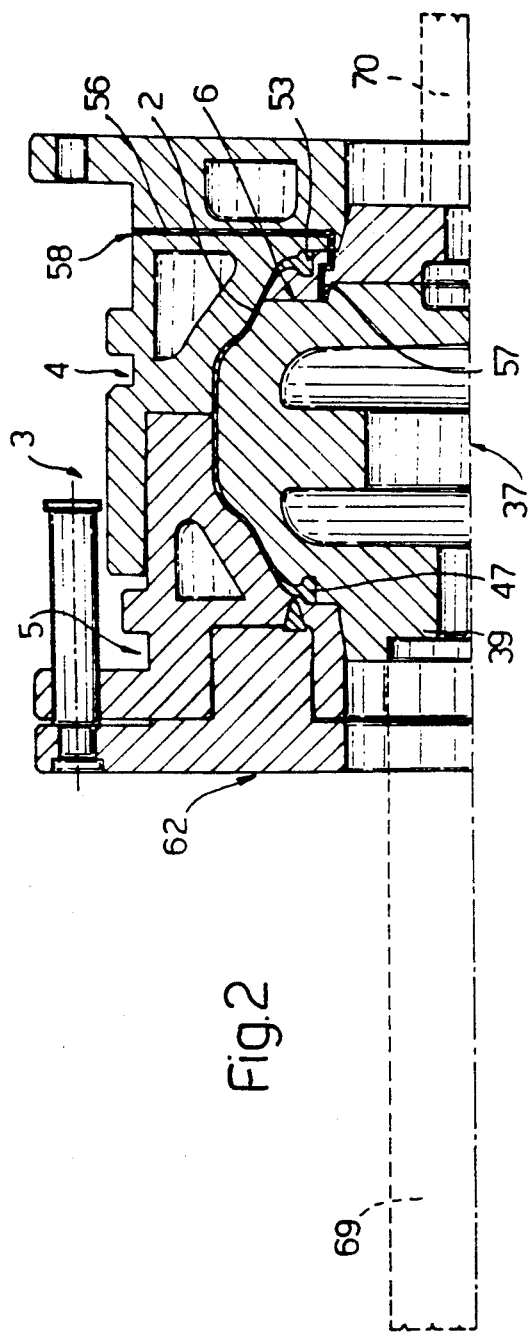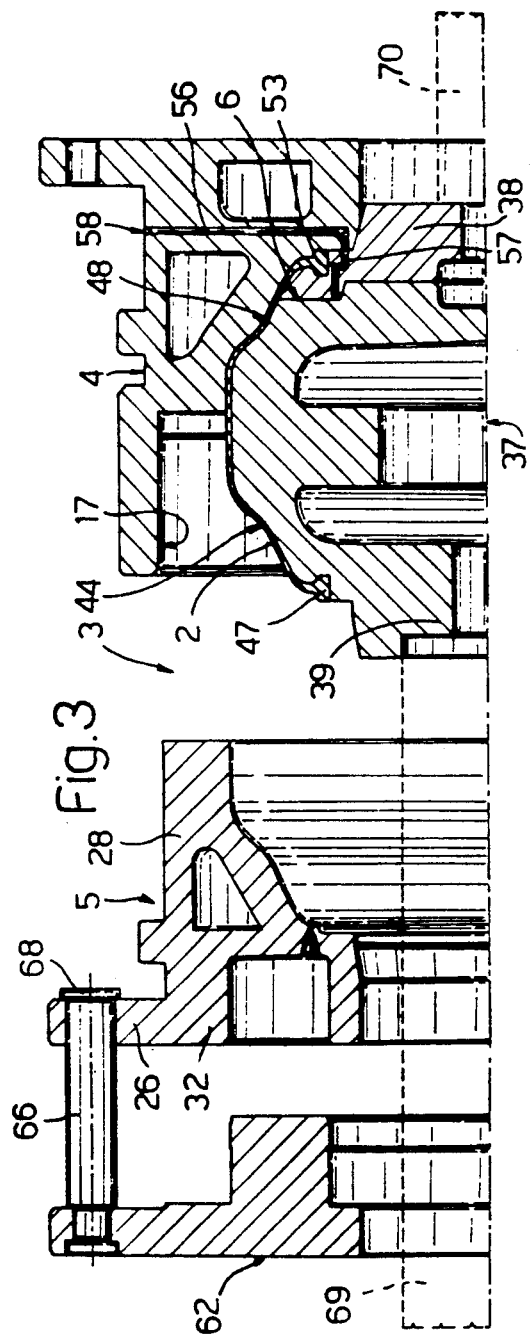

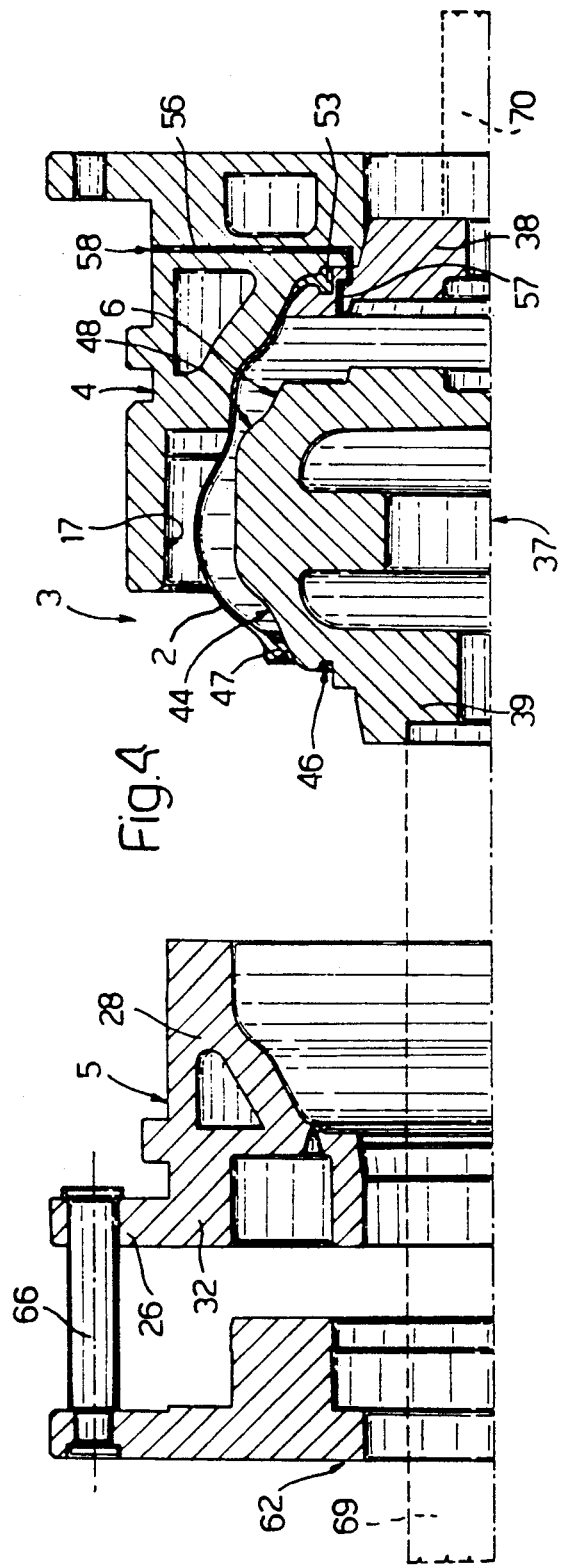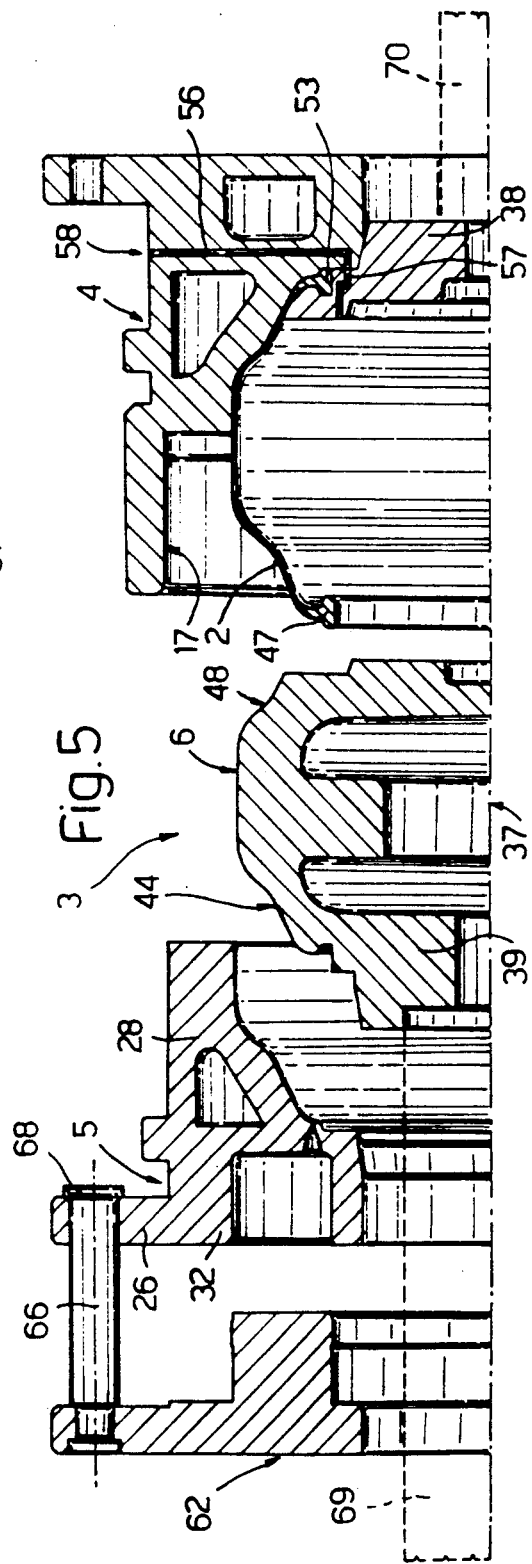

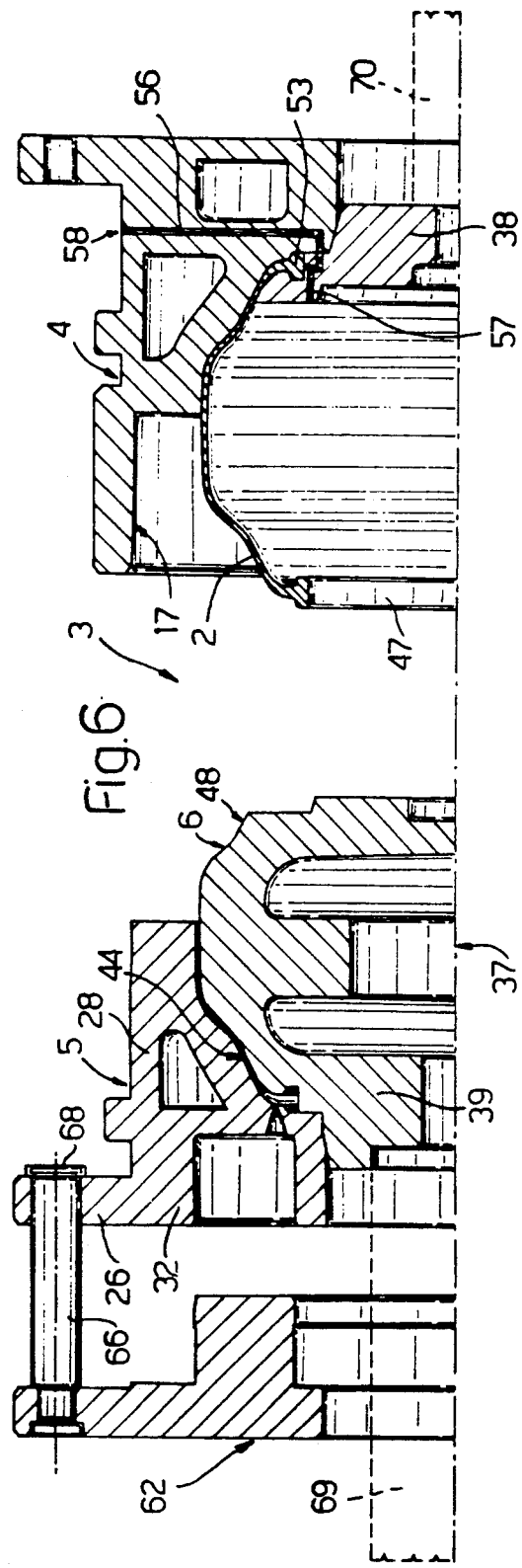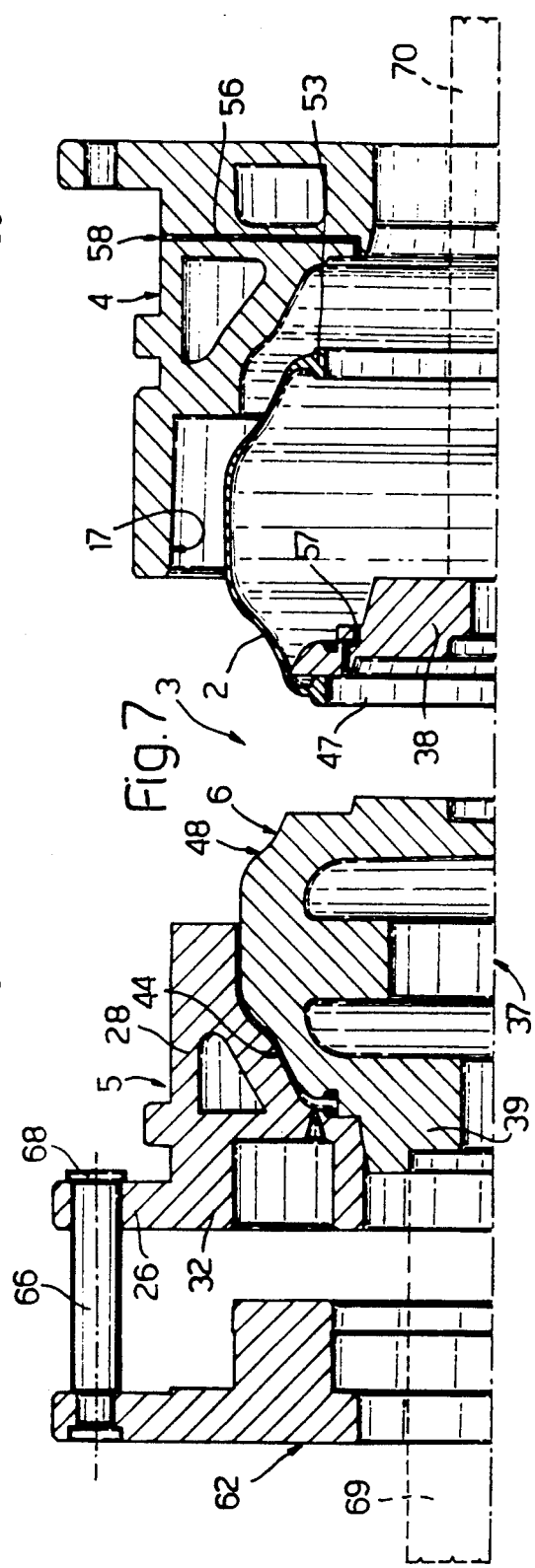

METHOD AND DEVICE FOR MANUFACTURING CURING BLADDERS

TECHNICAL FIELD

The present invention relates to a method of manufacturing curing bladders.

BACKGROUND OF THE ART

Tire curing molds generally comprise an upper and lower half mold connectable in such a manner as to define a toroidal chamber for receiving a green tire for curing, inside which tire a bladder is inflated, usually in two successive stages, so that the outer surface of the tire adheres to the inner surface of the mold, and also for defining a toroidal passage for a high-temperature heat exchange fluid.

Due to the mechanical and thermal stresses to which they are subjected and the particular function they are called upon to perform, bladders of the aforementioned type demand an extremely high degree of precision and are mostly either handcrafted or injection molded.

A less expensive known method of producing such bladders is by what is known as "compression molding." According to this process, the bladders are produced using a curing mold comprising two half molds and, possibly, an inner core, which, when the mold is closed, define an inner toroidal chamber of exactly the same shape as the bladder being produced. Prior to closing the mold, a mass of uncured or green rubber is fed inside one of the half molds and, when the mold is closed, is subjected to relatively high pressure so as to force it to move and completely fill the inner chamber.

The above compression molding process involves a number of drawbacks, foremost of which are the need for relatively high-capacity presses for closing molds, and the overall inaccuracy of the finished product. The latter is due to variations in the shape and volume of the inner chamber during actual molding, which inaccuracy results in friction between the moving rubber and the walls of the inner chamber, thus preventing the rubber from faithfully reproducing the shape of the inner chamber when the mold is closed.

SUMMARY OF THE INVENTION

The aim of the present invention is to provide a method of manufacturing curing bladders, preferably curing bladders for tires, which provides for the same precision as injection molding but at lower cost.

With this aim in view, according to the present invention, there is provided a method of manufacturing curing bladders using a curing mold comprising a first and second half mold and an inner core which, when the curing mold is closed, define a substantially toroidal inner molding chamber of the same shape as the bladder being produced; this method being characterized by the fact that it comprises stages consisting in feeding a mass of uncured rubber into a chamber outside the mold and communicating with the inner chamber via at least one injection duct; subjecting the mass of uncured rubber, via pressure means and with said mold closed, to sufficient pressure to inject it from the outer chamber into the inner chamber via the injection duct; curing the rubber inside the inner chamber so as to produce a finished bladder; and extracting the finished bladder from the mold by opening the inner chamber and extracting the inner core.

According to a preferred embodiment of the above method, the outer chamber is a variable-volume chamber of an injection cylinder; the pressure means consisting of a mobile piston of the cylinder closing the duct subsequent to injection.

According to the above method, the mass of uncured rubber is preferably heated to a given temperature before being injected into the inner chamber. Finally, the above method preferably comprises a further stage consisting in blowing air between the inner core and the finished bladder for detaching the bladder from the inner core.

Thus, as it is injected from the outer to the inner chamber, the preheated uncured rubber is heated even further, and by such an amount as to further reduce both curing time and the energy required for curing the bladder. Moreover, by virtue of the uncured rubber being injected from the outer to the inner chamber with the mold closed, the inner chamber presents, throughout the injection phase, a constant shape and volume, thus enabling the uncured rubber to fill the inner chamber with relatively little friction and so faithfully reproduce the shape of same.

The present invention also relates to a device for manufacturing curing bladders. According to the present invention, there is provided a device for manufacturing curing bladders, the device comprising a bladder curing mold in turn including mutually-mobile or movable first and second half molds and an extractable inner core, which, when the curing mold is closed, define a substantially toroidal inner molding chamber of the same shape as the bladder; characterized by the fact that it also includes a chamber outside the mold designed to receive a mass of uncured rubber; at least one injection duct enabling communication between the inner and outer chambers; and pressure means traveling along the outer chamber for injecting the mass of uncured rubber from the outer chamber to the inner chamber.

BRIEF DESCRIPTION OF THE DRAWINGS

A non-limiting embodiment of the present invention will be described by way of example with reference to the accompanying drawings, in which:

FIG. 1 shows an axial half section of a preferred embodiment of a device in accordance with the present invention in a first operating position; and FIGS. 2 to 7 show axial half sections of the FIG. 1 device in further operating positions.

BEST MODE FOR CARRYING OUT THE INVENTION

Number 1 in FIG. 1 indicates a device for manufacturing curing bladders 2 (best seen in FIGS. 4 to 7). Device 1 comprises a substantially cylindrical bladder curing mold 3 having a longitudinal axis A and in turn comprising mutually-mobile or movable first and second half molds 4 and 5 and an extractable inner core 6. Said half molds 4 and 5 and said inner core 6 are all coaxial with axis A and, when mold 3 is closed, define an inner molding chamber 7 coaxial with axis A and of substantially the same toroidal shape as bladder 2.

As shown in FIG. 1, half mold 4 comprises a substantially cylindrical annular body 8 having a central hole or aperture 9 coaxial with axis A and, at one end, an outer flange 10 by which it is secured to a supporting plate (not shown). Opposing flange 10, body 8 has a flat annular surface 11 and an axial annular appendix 12 coaxial with axis A and extending from the outer periphery of surface 11 towards half mold 5. The end of appendix 12, facing half mold 5, is defined by a flat annular surface 13, the outer periphery of which presents an annular groove or recess 14 engaged by the inner flange 15 of a cylindrical annular body 16 coaxial with axis A and extending from appendix 12 to half mold 5 so as to define, with surface 13, a toroidal chamber 17.

The outer surface of appendix 12 presents an annular groove closed externally by a wall 18 and defining a duct or cavity 19 for circulating a heat exchange fluid. Appendix 12 is defined internally by a shaped or contoured surface 20, starting at surface 13 and blending at the other end with surface 11 so as to define a first outer surface portion of inner chamber 7. On end surface 21 opposite to that of surface 13, body 8 presents a front annular groove surrounding hole 9 and closed outwardly by a cover 22, so as to define a duct 23 for circulating a heat exchange fluid.

As shown in FIG. 1, half mold 5 comprises a substantially cylindrical annular body 24 having a central hole 25 coaxial with axis A and, at one end, an outer annular flange 26. On the end, opposite to flange 26, body 24 presents a flat surface 27 and an axial annular appendix 28 coaxial with axis A and extending from the outer periphery of surface 27 towards half mold 4. Appendix 28 engages toroidal chamber 17 in half mold 4, and presents, on its free end facing half mold 5, a flat annular end surface 29 which, when mold 3 is closed, contacts surface 13 of half mold 4.

Annular end surface 30 of body 24, opposite surface 29, presents a front annular recess 31 housing an annular body 32. Body 32 presents a substantially L-shaped section, and divides the inside of recess 31 into two parts, a first part defining a duct 33 or cavity for circulating a heat exchange fluid, and a second part defining an outer annular chamber 34 coaxial with axis A and designed to receive a toroidal, body 35 consisting of a mass of uncured rubber. Appendix 28 is defined internally by a shaped or contoured surface 36, starting at surface 29 and blending at the other end with surface 24 so as to define a second outer surface portion of inner chamber 7.

As also shown in FIG. 1, inner core 6 comprises a central portion 37 and two end portions 38 and 39 aligned along and coaxial with axis A. In particular, central portion 37 consists of three bodies 40, 41 and 42, held together by means of bolts 43, the first of which is an annular plate located between the other two.

Body 41 is an annular body defined externally by a shaped or contoured lateral surface 44, facing surface 36 and defining an inner surface portion of chamber 7, and by a flat annular end surface 45 contacting annular surface 27 of body 24. Surface 44 blends with the outer periphery of surface 45 via an annular shaped groove which, together with surface 36, defines an annular channel 46 for forming a respective annular end expansion portion 47 of bladder 2 (FIG. 2). On the end facing half mold 5, annular body 41 is integrally fitted with end portion 39, which includes a conical base portion engaged inside a conical inner portion of hole 25.

Body 42 is defined externally by a shaped or contoured lateral surface 48, facing surface 20, and by a flat annular end surface 49 contacting an end surface of end portion 38. End portion 38 is also defined externally by a shaped lateral surface 50 facing surface 20 and blending with surface 48 so as to define with same an inner surface portion of chamber 7. End portion 38 also presents an intermediate annular shoulder 51 contacting annular surface 11 of body 8. Surface 50 blends with the outer periphery of shoulder 51, via an annular groove defining, together with surface 20, an annular channel 52 for forming a respective annular end expansion portion 53 of bladder 2 (FIG. 2). On the end facing half mold 4, end portion 38 presents a conical base 54 extending from shoulder 51 coaxially with axis A and engaging a conical inner portion of hole 9.

As shown in FIG. 1, the end surface of outer chamber 34 presents a number of injection ducts 55 (only one of which is shown) enabling communication between outer chamber 34 and inner chamber 7 in the vicinity of channel 46.

As shown, starting in FIG. 2, body 8 of mold half 4 presents a number of substantially radial through holes 56 (only one of which is shown) each exiting on surface 11 of body 8 and connecting with a respective further hole 57 formed substantially axially through core end portion 38 and having its outlet on the end surface of end portion 38 extending in contact with surface 49 of body 42. Said pairs of holes 56 and 57 (only one of which is shown) define the end portion of a respective compressed air injection-suction device indicated as a whole by 58.

According to a variation not shown, body 8 presents a first and second number of hole pairs 56-57, one defining the end portion of a compressed air injection device and the other a suction device.

As shown in FIG. 1 and particularly in FIG. 2, outer chamber 34 is a variable-volume chamber of an injection cylinder indicated as a whole by 59 and the piston of which is defined by an annular appendix or piston member 60 coaxial with axis A and chamber 34, and projecting towards half mold 5 from an annular plate 61 of a mobile or movable annular member 62. Said member 62 presents an outer flange 63 facing flange 26, and is normally connected to a mobile element (not shown) on a press (not shown), the fixed plate of which (mentioned previously and not shown) is fitted with half mold 4.

Flanges 63 and 26 include a number of pairs of coaxial holes 64 and 65 (only one pair of which is shown in FIG. 1) which are engaged by the opposite ends of a respective pin 66 for guiding mobile member 62 in relation to half mold 5. In particular, each pin 66 presents an end spigot 67 locked axially inside respective hole 64 and, at the other end, a flange 68 which acts as a limit stop and also as a connecting element for flanges 63 and 26 when mobile member 62 is moved away from half mold 5 beyond the point at which flanges 68 of pins 66 contact flange 26.

The operation of device 1 will now be described commencing with the operating position shown in FIG. 1, wherein mold 3 is closed, chamber 7 is empty, mobile member 62 is in the back-up or test position with flanges 68 contacting flange 26, and body 35 of uncured rubber has been preheated to a predetermined temperature in an oven and fed into chamber 34.

At this point, the press (not shown), between whose mobile and fixed elements (not shown) device 1 is mounted, is closed so as to engage piston member 60 of mobile member 62 gradually and at relatively high speed inside chamber 34, and inject the uncured rubber of body 35 from outer chamber 34 into inner chamber 7 through injection ducts 55. By the time mobile member 62 reaches the foremost limit position shown in FIG. 2, all the rubber of body 35 has been injected inside mold 3 so as to fill chamber 7 and form bladder 2, and ducts 55 are closed by piston member 60 contacting the inner end surface of outer chamber 34.

Bladder 2 is cured by the heat transmitted to it by a heat exchange fluid circulated continuously along ducts 23, 33 and 19 and inside inner core 6. Curing is effected relatively rapidly by virtue of the relatively high initial temperature of the uncured rubber injected into chamber 7, which temperature is due to both preheating of body 35 in an oven prior to injection, and the heat transmitted mechanically to the rubber as it is injected through ducts 55, the minimum section of which is relatively small. Moreover, as the shape and volume of chamber 7 remain unchanged during injection, the injected rubber occupies the full volume of chamber 7, thus producing a bladder 2 with an excellent surface finish and accurately reproducing the shape of chamber 7. Total filling of chamber 7 is further assisted by creating a vacuum inside chamber 7 via pneumatic device 58.

Once bladder 2 has been cured, the press (not shown) is opened as shown in FIG. 3, so as to move mobile member 62 first into the extracted position, wherein flanges 68 of pins 66 contact flange 26 (FIG. 1), then beyond this position so as to hook up half mold 5 and extract appendix 28 of body 32 from toroidal chamber 17 of half mold 4 and so open mold 3.

As shown in FIG. 4, upon mold 3 being opened, integral portions 37 and 39 of core 6 are moved away from end portion 38 via the action of a rod 69 extending through mobile member 62 and connected integrally with inner core portion 39. Simultaneously with the operation of rod 69, air is blown by injection device 58 between surfaces 44 and 48 of inner core 6 and bladder 2, so as to detach bladder 2 from the outer surface of inner core portions 37 and 39, and dilate and expel annular expansion 47 portion from respective annular channel 46.

As shown in FIG. 5, expansion of bladder 2 by the air blown in by pneumatic device 58 provides for fully extracting portions 37 and 39 of core 6 from bladder 2. Once freed from bladder 2, which is maintained contacting half mold 4 by portion 38, portions 37 and 39 are moved by rod 69 (FIG. 6) into contact with the inner surface of half mold 5 which is maintained by the press (not shown) in the open position shown in FIG. 3. Finally, as shown in FIG. 7, a further rod 70, coaxial with rod 69 and integral with portion 38 of core 6, extracts portion 38 from half mold 4 and into contact with the inner end of annular expansion portion 47. Further displacement of rod 70 detaches and at least partially extracts bladder 2 from half mold 4.

At this point, bladder 2, by now freed from half mold 4, may be freed from portion 38 of inner core 6 by slightly manually deforming annular expansion portion 53.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. A method of manufacturing curing bladders using a curing mold comprising a first and second half mold and an inner core which, when said curing mold is closed around said inner core, define a substantially toroidal inner molding chamber of the same shape as the bladder to be produced, said inner core comprising first and second axially separable portions; said method comprising the steps of feeding a mass of uncured rubber into a chamber outside said mold, said outer chamber communicating with said inner chamber via at least one injection duct; subjecting said mass of uncured rubber, via pressure means and with said mold closed, to sufficient pressure to inject said rubber from said outer chamber into said inner chamber via said injection duct; curing said rubber inside said inner chamber so as to produce a finished bladder; extracting said finished bladder from said mold by opening said inner chamber and extracting said inner core only after said finished bladder is cured; and detaching said finished bladder from said first core portion with said second core portion acting as an extractor for said finished bladder after said finished bladder is extracted from said first core portion.

2. A method as claimed in claim 1, wherein said outer chamber is a variable-volume chamber of an injection cylinder; said pressure means having a movable piston portion of said cylinder and closing said injection duct subsequent to injection.

3. A method as claimed in claim 2, wherein said mass of uncured rubber is heated to a predetermined temperature prior to being injected into said inner chamber.

4. A method as claimed in claim 1, comprising a further step of blowing air between said inner core and said finished bladder so as to detach said finished bladder from said inner core.

5. A device for manufacturing curing bladders, said device comprising a bladder curing mold, said mold including mutually-movable first and second half molds and an extractable inner core, said half molds and core when said curing mold is closed, defining a substantially toroidal inner molding chamber of the same shape as said bladder when the mold halves are closed around the inner core; a chamber outside one of said half molds designed to receive a mass of uncured rubber; at least one injection duct enabling communication between said inner and outer chambers; pressure means traveling along said outer chamber for injecting said mass of uncured rubber from said outer chamber into said inner chamber, wherein said inner core is comprised of first and second axially separable portions; said second portion being movable in relation to said half molds so as to act as an extractor for a finished bladder.

6. A device as claimed in claim 5, wherein said outer chamber is a variable-volume chamber of an injection cylinder; and said pressure means consisting of a movable piston portion of said cylinder.

7. A device as claimed in claim 6, wherein said outer chamber is formed on the outer surface of one of said half molds; guide means being provided between said piston portion and the half mold having said outer chamber, for guiding said piston portion as said piston portion moves axially and reciprocatingly in relation to said half mold having said outer chamber between a fully extracted position and a position wherein said piston portion contacts the inner surface of said outer chamber.

8. A device as claimed in claim 7, wherein said guide means include limit stop means for axially displacing an associated half mold together with said piston portion when said piston portion is moved beyond said fully extracted position.

9. A device as claimed in claim 5, including injection means for blowing air inside said inner chamber; said injection means exiting on the outer surface of said inner core.

* * * * *